United States Patent
Kim et al.

(10) Patent No.: US 9,023,500 B2
(45) Date of Patent: May 5, 2015

(54) CYLINDRICAL SECONDARY BATTERY

(75) Inventors: Jong-Ku Kim, Yongin-si (KR);
Byung-Lyang Lee, Yongin-si (KR);
June-Hyoung Park, Yongin-si (KR);
Chan-Woo Park, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 678 days.

(21) Appl. No.: 12/923,564

(22) Filed: Sep. 28, 2010

(65) Prior Publication Data

US 2011/0123846 A1    May 26, 2011

(30) Foreign Application Priority Data

Nov. 20, 2009 (KR) .......................... 10-2009-0112807

(51) Int. Cl.
  *H01M 4/00* (2006.01)
  *H01M 2/36* (2006.01)
  *H01M 2/04* (2006.01)
  *H01M 2/12* (2006.01)
  *H01M 10/04* (2006.01)

(52) U.S. Cl.
  CPC .......... *H01M 2/361* (2013.01); *H01M 2/0413* (2013.01); *H01M 2/12* (2013.01); *H01M 10/0422* (2013.01)

(58) Field of Classification Search
  USPC ........................................................... 429/94
  See application file for complete search history.

(56) References Cited

U.S. PATENT DOCUMENTS

2006/0257735 A1* 11/2006 Kim .............................. 429/208
2008/0160393 A1* 7/2008 Kim et al. ....................... 429/94

FOREIGN PATENT DOCUMENTS

| JP | 07-220716 A | 8/1995 |
| JP | 08-153511 A | 6/1996 |
| JP | 11-031487 A | 2/1999 |
| JP | 2002-100343 A | 4/2002 |
| KR | 10 2000-0018605 A | 4/2000 |
| KR | 10 2000-0066690 A | 11/2000 |
| KR | 10-2005-0110504 A | 11/2005 |
| KR | 10 2008-0081471 A | 2/2008 |

OTHER PUBLICATIONS

Office Action issued in corresponding Korean application, 10-2009-0112807, dated Jul. 29, 2011.

* cited by examiner

*Primary Examiner* — Ula C Ruddock
*Assistant Examiner* — Jacob Marks
(74) *Attorney, Agent, or Firm* — Lee & Morse, P.C.

(57) ABSTRACT

A cylindrical secondary battery including a battery unit including a wound first electrode plate, separator, and second electrode plate, and first and second electrode tabs respectively protruding from the first and second electrode plates; a can for accommodating the battery unit; a cap assembly for sealing an opening of the can; and a first insulation plate in the can and on an upper portion of the battery unit, the first insulation plate being configured to prevent a short between the first electrode tab and the second electrode plate having different polarities, wherein the first insulation plate includes a linear small aperture through which the first electrode tab extends and a circular small aperture for injection of an electrolyte, and the linear and circular small apertures are disposed in a region equal to or less than 50% of the first insulation plate.

12 Claims, 3 Drawing Sheets

CYLINDRICAL SECONDARY BATTERY

BACKGROUND

1. Field

Embodiments relate to a cylindrical secondary battery.

2. Description of the Related Art

In general, unlike primary batteries that are not rechargeable, secondary batteries are rechargeable and dischargeable. Secondary batteries are used in small-sized devices, e.g., cellular phones, notebook computers, and camcorders, or medium- and large-sized devices, e.g., electric vehicles, electric bicycles, and uninterruptible power supplies (UPSs). Among secondary batteries, a lithium (Li) battery has a higher energy density per unit weight than, e.g., a Li-cadmium (Cd) battery or a Li-hydrogen (H) battery, and thus is widely used.

Li batteries generally use Li-based oxide as a positive electrode active material and a carbon material as a negative electrode active material. According to the type of electrolyte, Li batteries are classified into a liquid electrolyte battery and a polymer electrolyte battery. A battery using a liquid electrolyte is referred to as a Li ion battery and a battery using a polymer electrolyte is referred to as a Li polymer battery. According to the shape of a can for accommodating a battery unit, Li batteries may be classified into cylindrical and rectangular batteries and a pouch battery having flexibility.

A general cylindrical battery includes a battery unit, a can for accommodating the battery unit, and a cap assembly for sealing an opening of the can. The battery unit includes a positive electrode plate, a negative electrode plate, and a separator interposed between the positive and negative electrode plates. The positive electrode plate is electrically connected to a positive electrode tab and the negative electrode plate is electrically connected to a negative electrode tab. The positive and negative electrode tabs are respectively electrically connected to the cap assembly and the can.

In this case, the positive electrode tab is connected to the cap assembly through a penetration hole of an insulation plate on an upper portion of the battery unit.

SUMMARY

Embodiments are directed to a cylindrical secondary battery, which represents advances over the related art.

It is a feature of an embodiment to provide a cylindrical secondary battery having an improved shape of an insulation plate at one side of a battery unit in order to prevent an electric short between an electrode tab and an electrode plate and/or can having a different polarity from the electrode tab.

At least one of the above and other features and advantages may be realized by providing a cylindrical secondary battery including a battery unit including a wound first electrode plate, separator, and second electrode plate, and first and second electrode tabs respectively protruding from the first and second electrode plates; a can for accommodating the battery unit; a cap assembly for sealing an opening of the can; and a first insulation plate in the can and on an upper portion of the battery unit, the first insulation plate being configured to prevent a short between the first electrode tab and the second electrode plate having different polarities, wherein the first insulation plate includes a linear small aperture through which the first electrode tab extends and a circular small aperture for injection of an electrolyte, and the linear and circular small apertures are disposed in a region equal to or less than 50% of the first insulation plate.

The linear small aperture may be a first electrode tab hole having a size that ensures a tight fit of the first electrode tab therein.

The first electrode tab may protrude upwardly from the battery unit through the first electrode tab hole and may be electrically connected to the cap assembly, and the second electrode tab may protrude downwardly from the battery unit and may be directly connected to the can.

The first electrode tab may be a positive electrode tab and the second electrode tab may be a negative electrode tab.

The cap assembly may include a cap-up unit on the can, the cap-up unit constituting a first electrode terminal, a plurality of safety elements between the battery unit and the cap-up unit, and a gasket disposed around the cap-up unit and the safety elements, wherein the first electrode tab is electrically connected to the safety elements.

The cylindrical secondary battery may further include a second insulation plate between a bottom surface of the can and the battery unit, the second insulation plate including a second electrode tab hole through which the second electrode tab extends.

The cylindrical secondary battery may further include another circular small aperture in the first insulation plate, the other small aperture constituting a gas discharge hole for discharging a gas.

The linear and circular small apertures may be collectively disposed in one side region with reference to a central line of the first insulation plate.

The linear small aperture may extend in a direction perpendicular to a direction in which the first electrode tab is bent.

The circular small apertures may be disposed at sides of the linear small aperture.

The linear and circular small apertures may be disposed along a straight line.

The can may include a beading unit at an upper portion of the battery unit, and the first insulation plate may be interposed between the beading unit and the upper portion of the battery unit.

At least one of the above and other features and advantages may also be realized by providing a cylindrical secondary battery including a battery unit including a wound first electrode plate, separator, and second electrode plate, and first and second electrode tabs respectively protruding from the first and second electrode plates; a can for accommodating the battery unit; a cap assembly for sealing an opening of the can; and a first insulation plate in the can and on an upper portion of the battery unit, the first insulation plate being configured to prevent a short between the first electrode tab and the second electrode plate having different polarities, wherein the first insulation plate includes a linear small aperture through which the first electrode tab extends, and the first electrode tab is bent between the cap assembly and the first insulation plate in a direction perpendicular to the linear small aperture.

The linear small aperture may be a first electrode tab hole having a size that ensures a tight fit of the first electrode tab therein.

The first insulation plate may include one or more circular small apertures at sides of the linear small aperture.

The circular small apertures may include a gas discharge hole for discharging a gas; and a electrolyte injection hole for injecting an electrolyte.

The linear and circular small apertures may be collectively disposed in one side region with reference to a central line of the first insulation plate.

The linear and circular small apertures may be disposed along a straight line.

The first electrode tab may be a positive electrode tab and the second electrode tab may be a negative electrode tab.

The first electrode tab may protrude upwardly from the battery unit through the linear small aperture and may be electrically connected to the cap assembly.

The cap assembly may include a cap-up unit on the can, the cap-up unit constituting a first electrode terminal; a plurality of safety elements between the battery unit and the cap-up unit; and a gasket disposed around the cap-up unit and the safety elements, wherein the first electrode tab is electrically connected to the safety elements.

The can may include a beading unit at an upper portion of the battery unit, and the first insulation plate may be interposed between the beading unit and the upper portion of the battery unit.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
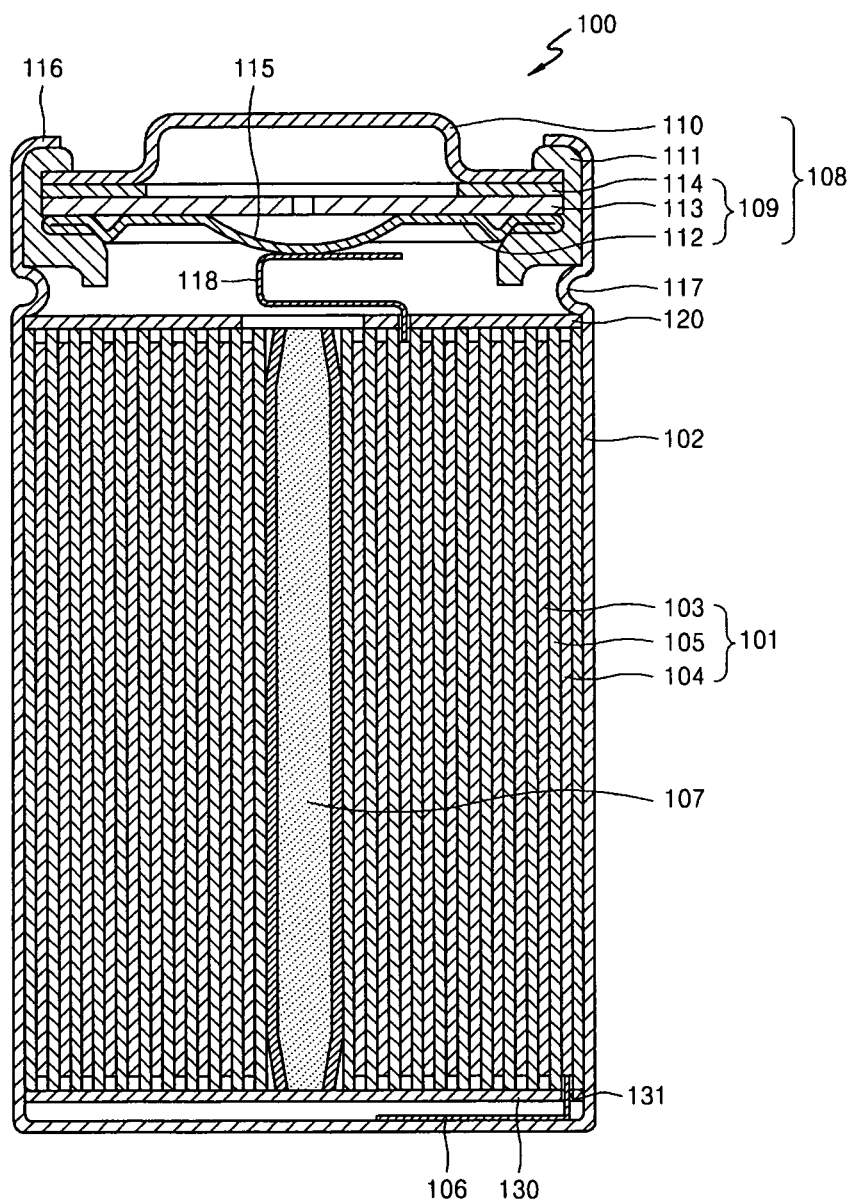
FIG. 1 illustrates a cross-sectional view of a cylindrical secondary battery according to an embodiment.

Korean Patent Application No. 10-2009-0112807, filed on Nov. 20, 2009, in the Korean Intellectual Property Office, and entitled: "Cylindrical Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Figure 2:
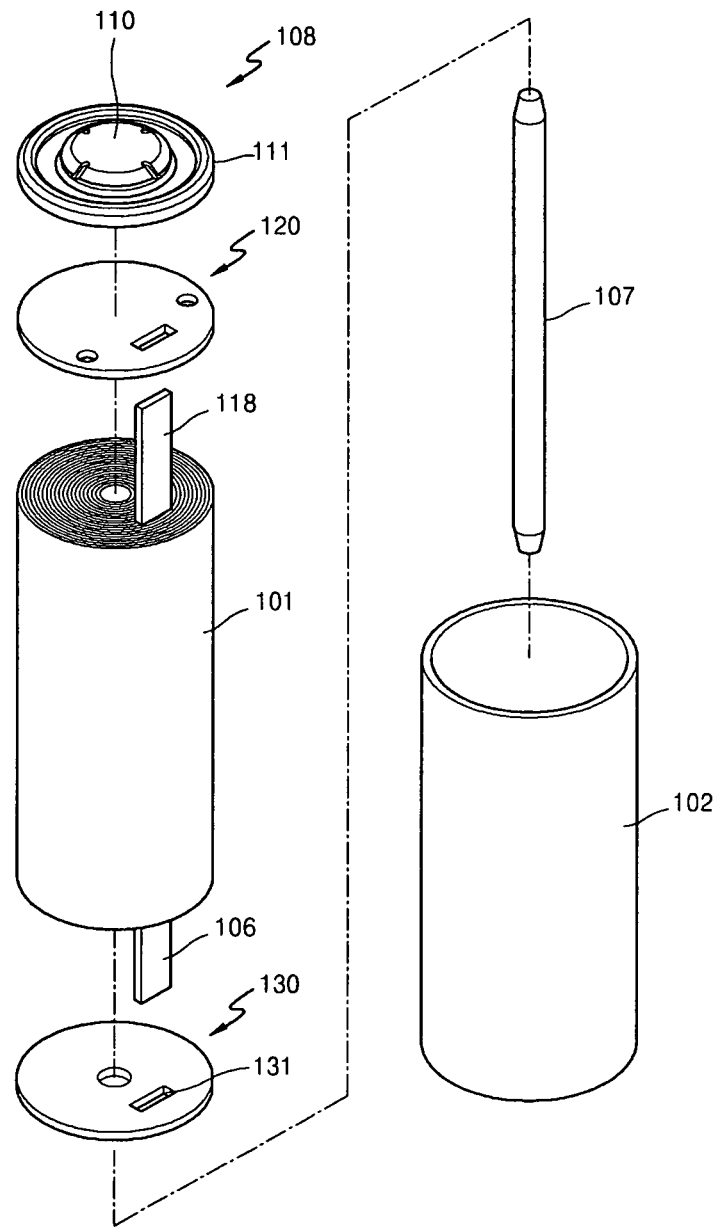
FIG. 2 illustrates an exploded perspective view of the cylindrical secondary battery of FIG. 1.
Figure 3:
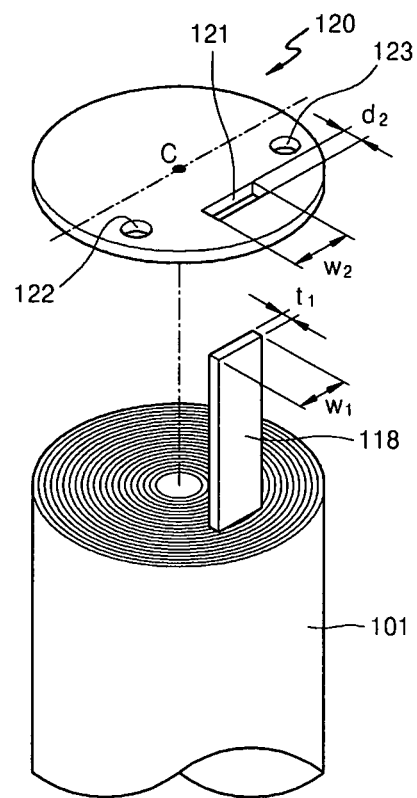
FIG. 3 illustrates a magnified perspective view of an upper insulation plate of
FIG. 1.

FIG. 1 illustrates a cross-sectional view of a cylindrical secondary battery 100 according to an embodiment. FIG. 2 illustrates an exploded perspective view of the cylindrical secondary battery 100 of FIG. 1. FIG. 3 illustrates a magnified perspective view of an upper insulation plate 120 of FIG. 1.

Referring to FIGS. 1 through 3, the secondary battery 100 may include a battery unit 101 and a can 102 for accommodating the battery unit 101.

The battery unit 101 may include a positive electrode plate 103, a negative electrode plate 104, and a separator 105 interposed between the positive and negative electrode plates 103 and 104.

The positive electrode plate 103 may include a positive electrode current collector formed from a metal foil strip, e.g., an aluminum (Al) foil strip, and a positive electrode active material layer coated on at least one surface of the positive electrode current collector. The positive electrode active material layer may include, e.g., lithium (Li)-based oxide, as a main component and may also include a positive electrode binder, a positive conductor, etc. The positive electrode current collector of the positive electrode plate 103 may be electrically connected to a positive electrode tab 118. The positive electrode tab 118 may protrude upwardly from the can 102 and may be bent at least once.

The negative electrode plate 104 may include a negative electrode current collector formed from a metal foil strip, e.g., a copper (Cu) foil strip, and a negative electrode active material layer coated on at least one surface of the negative electrode current collector. The negative electrode active material layer may include, e.g., carbon black, as a main component and may also include a negative electrode binder, etc. The negative electrode current collector of the negative electrode plate 104 may be electrically connected to a negative electrode tab 106. The negative electrode tab 106 may protrude downwardly from the battery unit 101 and may be welded to a bottom surface of the can 102.

The separator 105 may be, e.g., a porous insulator, and may be formed from, e.g., a polyethylene film, a polypropylene film, or a combination film thereof An electrolyte may include Li salt, e.g., $LiPF_6$, and an electrolyte solvent, e.g., EC, DMC, MEC, and/or PC.

The battery unit 101 may be formed by winding the positive electrode plate 103, the negative electrode plate 104, and the separator 105 between the positive and negative electrode plates 103 and 104, in a jelly-roll type formation.

A center pin 107 may be inserted into the center of the battery unit 101. The center pin 107 may prevent the battery unit 101 from being unwound; and may facilitate exhaustion of a gas generated in the battery unit 101.

The wound battery unit 101 may be inserted into the can 102. The can 102 may be a cylindrical metallic material having a hollow interior corresponding to an outer shape of the battery unit 101. Since the negative electrode tab 106 electrically connected to the negative electrode plate 104 may be welded to the bottom surface of the can 102, the can 102 itself may function as a negative electrode terminal. The can 102 may be formed of a conductive metallic material, e.g., aluminum (Al), iron (Fe), or an Al or Fe alloy, and may be formed by performing a pressing process such as a deep drawing process.

A cap assembly 108 may be disposed on an upper portion of the can 102 so as to seal an opening of the can 102. The cap assembly 108 may include a plurality of safety elements 109 on the battery unit 101, a conductive cap-up unit 110 on the safety elements 109, and a gasket 111 disposed around, i.e., surrounding or encircling, the safety elements 109 and the cap-up unit 110.

The safety elements 109 may include, e.g., a safety vent 112, a current interrupt device (CID) element 113, and/or a positive temperature coefficient (PTC) element 114. The safety elements 109 are not limited to any one type of safety element, as long as the safety elements are used to ensure safety of the secondary battery 100 when an error occurs.

The safety vent 112 may have a plate shape; and a deformation unit 115 protruding downward may be disposed at a center of the safety vent 112. The deformation unit 115 may be electrically connected to the positive electrode tab 118 that is bent at least once. If an internal pressure of the secondary battery 100 increases excessively, the deformation unit 115 may be inverted upward so as to be disconnected from the positive electrode tab 118. Accordingly, a charge or discharge current may be interrupted.

The CID element 113 may be disposed on an upper surface of the safety vent 112 and may be electrically connected to the safety vent 112. The CID element 113 may be broken when the deformation unit 115 of the safety vent 112 is convexly deformed upward so as to disconnect an internal circuit.

The PTC element 114 may be disposed on an upper surface of the CID element 113 and may be electrically connected to the CID element 113. The PTC element 114 may have an electrical resistance that is increased almost infinitely when a temperature of the PTC element 114 exceeds a predetermined level. Thus, the PTC element 114 may interrupt a charge or discharge current when a temperature of the secondary battery 100 is abnormally high. Since the PTC element 114 may operate reversibly, after the PTC element 114 interrupts a current, if the temperature of the secondary battery 100 is decreased again, the resistance may also be decreased and the secondary battery 100 may operate again. The PTC element 114 may have a resistance that is increased to infinity at about 100° C.

The cap-up unit 110 may be disposed on the PTC element 114. The cap-up unit 110 may be formed of a conductive material. The cap-up unit 110 may be electrically connected to the positive electrode plate 103, the positive electrode tab 118, the safety vent 112, the CID element 113, and the PTC element 114, in that order, so as to function as a positive electrode terminal.

The gasket 111 may be disposed around and may wrap, i.e., surround or encircle, the cap-up unit 110, the safety vent 112, the CID element 113, and the PTC element 114, and may insulate the cap assembly 108 from the can 102. The gasket 111 may be formed of an insulating material.

A crimping unit 116 may be formed by bending an upper portion of the can 102 inward and pressing an upper surface of the gasket 111. A beading unit 117 may be formed by inwardly depressing a portion of the can 102 corresponding to a thickness of the cap assembly 108 from the upper portion of the can 102. Thus, the cap assembly 108 may be formed between the crimping unit 116 and the beading unit 117.

The upper insulation plate 120 may have a ring, i.e., circular, shape and may be disposed between an upper portion of the battery unit 101 and the beading unit 117. A lower insulation plate 130 may have a ring, i.e., circular, shape and may be disposed between a lower portion of the battery unit 101 and a bottom surface of the can 102.

A plurality of small apertures, i.e., openings, may be disposed in the upper insulation plate 120 so as to prevent electrical contact between the positive electrode tab 118 and the negative electrode plate 104, which have different polarities.

This aspect will now be described in more detail.

The upper insulation plate 120 may be a circular plate corresponding to the cylindrical shape of the can 102. An outer circumferential surface of the upper insulation plate 120 may contact an inner circumferential wall of the can 102 when the upper insulation plate 120 is inserted into the hollow interior of the can 102. In this case, a lower surface of the upper insulation plate 120 may be disposed on the battery unit 101 and an upper surface of the upper insulation plate 120 may be disposed under the beading unit 117.

A positive electrode tab hole 121 for providing a passage through which the positive electrode tab 118 extends may be disposed in the upper insulation plate 120. The positive electrode tab hole 121 may be a linear small aperture. The positive electrode tab 118 may be electrically connected to the positive electrode plate 103 and may protrude through the positive electrode tab hole 121 to a space between the safety vent 112 and the upper insulation plate 120. In order to minimize the space, the positive electrode tab 118 may be bent at least once.

In an implementation, the positive electrode tab 118 may have a rectangular cross-section; and the positive electrode tab hole 121 may have a rectangular shape corresponding to the positive electrode tab 118. In addition, the positive electrode tab 118 may have a size that ensures a tight and snug fit into the positive electrode tab hole 121. A width w2 and a length d2 of the positive electrode tab hole 121 may be greater than a width w1 and a thickness t1 of the positive electrode tab 118.

The positive electrode tab 118 may protrude through the positive electrode tab hole 121 and may be bent at least once in a certain direction. In particular, the positive electrode tab 118 may be bent in a direction perpendicular to a long axis direction of the positive electrode tab hole 121 that is a linear small aperture. In this case, the bent portion of the positive electrode tab 118 may be disposed on the upper insulation plate 120.

Circular small apertures may be disposed above and below, i.e., at sides of, the positive electrode tab hole 121. In particular, an electrolyte injection hole 122 for providing a passage through which the electrolyte may be injected and a gas discharge hole 123 for providing a passage through which a gas generated in the can 102 may be discharged, may be disposed in the upper insulation plate 120. The electrolyte may be injected through both the electrolyte injection hole 122 and the gas discharge hole 123; and the gas may be discharged through both the electrolyte injection hole 122 and the gas discharge hole 123.

The positive electrode tab hole 121, the electrolyte injection hole 122, and the gas discharge hole 123 may be collectively disposed in one side region with reference to a virtual central line C of the upper insulation plate 120. Thus, the positive electrode tab hole 121, the electrolyte injection hole 122, and the gas discharge hole 123 may be disposed in a region equal to or less than 50% of the upper insulation plate 120. That is, the region in which the positive electrode tab hole 121, the electrolyte injection hole 122, and the gas discharge hole 123 are located has an area which is equal to or less than 50% of the area of the upper insulation plate 120. Also, the positive electrode tab hole 121, the electrolyte injection hole 122, and the gas discharge hole 123 may be confined to only one hemisphere of the upper insulation plate 120. In addition, the electrolyte injection hole 122 and the gas discharge hole 123 may be disposed in an almost straight line with respect to the positive electrode tab hole 121. In other words, the electrolyte injection hole 122, the gas discharge hole 123, and the positive electrode tab hole 121 may be aligned.

Thus, when the positive electrode tab 118 is bent in a direction perpendicular to the positive electrode tab hole 121 that is a linear small aperture, interference with the electrolyte injection hole 122 and the gas discharge hole 123 may be advantageously prevented.

The negative electrode tab 106 may protrude between the lower portion of the battery unit 101 and the bottom surface of the can 102 through the negative electrode tab hole 131 of the lower insulation plate 130. The negative electrode tab may be electrically connected to the bottom surface of the can 102.

In the secondary battery 100, the battery unit 101 may be formed by winding the positive electrode plate 103, the negative electrode plate 104, and the separator 105 between the positive and negative electrode plates 103 and 104, in a jelly-roll type formation.

The wound battery unit 101 may be inserted into the can 102. In an implementation, the negative electrode tab 106 electrically connected to the negative electrode plate 104 may protrude through the negative electrode tab hole 131 of the lower insulation plate 130 on the lower portion of the battery unit 101, and may be electrically welded to the bottom surface of the can 102.

After the battery unit 101 is inserted into the can 102, the upper insulation plate 120 may be disposed on the upper portion of the battery unit 101. The beading unit 117 may be formed on the upper insulation plate 120 by applying pressure to an outer wall of the can 102.

The positive electrode tab 118 electrically connected to the positive electrode plate 103 may protrude from the upper insulation plate 120 through the positive electrode tab hole 121 in the upper insulation plate 120. The positive electrode tab 105 may be tightly fitted, i.e., force fitted, into the positive electrode tab hole 121 and thus may not move.

Then, the electrolyte may be injected into the can 102 through the electrolyte injection hole 122 in the upper insulation plate 120. The cap assembly 108 may be disposed on an upper surface of the beading unit 117. In the cap assembly 108, the safety vent 112, the CID element 113, the PTC element 114, and the cap-up unit 110 may be stacked in a direction perpendicular to the battery unit 101. The gasket 111 may be disposed around and may wrap, i.e., may surround, the safety vent 112, the CID element 113, the PTC element 114, and the cap-up unit 110.

The bent portion of the positive electrode tab 118 may be welded to the deformation unit 115 of the safety vent 112. In an implementation, the positive electrode tab 118 may be bent at least once in a direction perpendicular to a long axis of the positive electrode tab hole 121 that is a linear small aperture, and may be disposed on the upper insulation plate 120. The positive electrode tab 118 may be disposed in one side region with reference to the virtual central line C of the upper insulation plate 120, and interference may not occur between the electrolyte injection hole 122 and the gas discharge hole 123 respectively disposed above and below, i.e., at sides of, the positive electrode tab hole 121.

Then, the crimping unit 116 may be formed by bending the upper portion of the can 102 inward; and the can 102 may be sealed. A pressing process may be performed to control an overall height of the sealed secondary battery 100, thus completing formation of the secondary battery 100.

As described above, according to the embodiments, as a small aperture of an insulation plate of a cylindrical secondary battery is defined in a certain shape, even when an electrode tab is abnormally bent, an electric short between the electrode tab and an electrode plate and/or a can having a different polarity from the electrode tab may be prevented in advance. Thus, stability of the cylindrical secondary battery may be improved.

Depending on a location, size, and number of penetration holes of the insulation plate, when the positive electrode tab is abnormally bent, a bent portion of the positive electrode tab may contact the negative electrode plate or the can having a different polarity from the positive electrode tab. As a result, an electric short may occur between the positive electrode tab and the negative electrode plate and/or can having different polarities. In the cylindrical battery according to an embodiment, the upper insulation plate is configured such that the positive electrode tab is prevented from contacting components having a different polarity thereto.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A cylindrical secondary battery, comprising:
   a battery unit including:
      a wound first electrode plate, separator, and second electrode plate, and
      first and second electrode tabs respectively protruding from the first and second electrode plates;
   a can for accommodating the battery unit;
   a cap assembly for sealing an opening of the can; and
   a first insulation plate in the can and on an upper portion of the battery unit, the first insulation plate having a circular shape and being configured to prevent a short between the first electrode tab and the second electrode plate having different polarities,
   wherein:
   the first insulation plate includes a linear small aperture through which the first electrode tab extends, one circular small aperture for injection of an electrolyte, and another circular small aperture constituting a gas discharge hole for discharging a gas,
   the first insulation plate is circular and corresponds to a shape of the can,
   the linear and circular small apertures are disposed in a region equal to or less than 50% of the first insulation plate such that the linear and circular small apertures are confined to only one hemisphere of the first insulation plate, such that all of the linear and circular small apertures are confined to only the one hemisphere of the first insulation plate,
   the linear small aperture extends in a direction perpendicular to a direction in which the first electrode tab is bent,
   the circular small apertures are disposed at sides of the linear small aperture,
   the linear and circular small apertures are disposed along a straight line, and
   a bent portion of the first electrode tab is disposed on the first insulation plate not to overlap with the circular small apertures.

2. The cylindrical secondary battery as claimed in claim 1, wherein the linear small aperture is a first electrode tab hole having a size that ensures a tight fit of the first electrode tab therein.

3. The cylindrical secondary battery as claimed in claim 2, wherein:
   the first electrode tab protrudes upwardly from the battery unit through the first electrode tab hole and is electrically connected to the cap assembly, and
   the second electrode tab protrudes downwardly from the battery unit and is directly connected to the can.

4. The cylindrical secondary battery as claimed in claim 3, wherein the first electrode tab is a positive electrode tab and the second electrode tab is a negative electrode tab.

5. The cylindrical secondary battery as claimed in claim 3, wherein the cap assembly includes:
   a cap-up unit on the can, the cap-up unit constituting a first electrode terminal,
   a plurality of safety elements between the battery unit and the cap-up unit, and
   a gasket disposed around the cap-up unit and the safety elements,
   wherein the first electrode tab is electrically connected to the safety elements.

6. The cylindrical secondary battery as claimed in claim 3, further comprising a second insulation plate between a bottom surface of the can and the battery unit, the second insulation plate including a second electrode tab hole through which the second electrode tab extends.

7. The cylindrical secondary battery as claimed in claim 1, wherein:
the can includes a beading unit at an upper portion of the battery unit, and
the first insulation plate is interposed between the beading unit and the upper portion of the battery unit.

8. A cylindrical secondary battery, comprising:
a battery unit including:
a wound first electrode plate, separator, and second electrode plate, and
first and second electrode tabs respectively protruding from the first and second electrode plates;
a can for accommodating the battery unit;
a cap assembly for sealing an opening of the can; and
a first insulation plate in the can and on an upper portion of the battery unit, the first insulation plate being configured to prevent a short between the first electrode tab and the second electrode plate having different polarities,
wherein:
the first insulation plate includes a linear small aperture into which the first electrode tab is force-fitted,
the first electrode tab is bent between the cap assembly and the first insulation plate in a direction perpendicular to the linear small aperture,
a bent portion of the first electrode tab is disposed on the first insulation plate not to overlap with the circular small apertures,
the first insulation plate includes one or more circular small apertures at sides of the linear small aperture,
the first insulation plate is circular and corresponds to a shape of the can,
the circular small apertures include a gas discharge hole for discharging a gas; and a electrolyte injection hole for injecting an electrolyte,
the linear and circular small apertures are collectively disposed in one side region with reference to a central line of the first insulation plate such that all of the linear and circular small apertures are confined to only one hemisphere of the first insulation plate, and
the linear and circular small apertures are disposed along a straight line.

9. The cylindrical secondary battery as claimed in claim 8, wherein the first electrode tab is a positive electrode tab and the second electrode tab is a negative electrode tab.

10. The cylindrical secondary battery as claimed in claim 8, wherein the first electrode tab protrudes upwardly from the battery unit through the linear small aperture and is electrically connected to the cap assembly.

11. The cylindrical secondary battery as claimed in claim 10, wherein the cap assembly includes:
a cap-up unit on the can, the cap-up unit constituting a first electrode terminal;
a plurality of safety elements between the battery unit and the cap-up unit; and
a gasket disposed around the cap-up unit and the safety elements,
wherein the first electrode tab is electrically connected to the safety elements.

12. The cylindrical secondary battery as claimed in claim 8, wherein:
the can includes a beading unit at an upper portion of the battery unit, and the first insulation plate is interposed between the beading unit and the upper portion of the battery unit.

* * * * *